United States Patent
Li et al.

(10) Patent No.: US 10,927,275 B2
(45) Date of Patent: Feb. 23, 2021

(54) ALUMINA SOL-SILANE COMPOSITE MATERIAL AND PREPARATION METHOD AND APPLICATION THEREOF

(71) Applicant: Qingdao University of Technology, Shandong (CN)

(72) Inventors: Shaochun Li, Qingdao (CN); Dongshuai Hou, Qingdao (CN); Yongjuan Geng, Qingdao (CN); Wenjuan Zhang, Qingdao (CN); Zuquan Jin, Qingdao (CN); Yaguang Zhu, Qingdao (CN); Youlai Zhang, Qingdao (CN)

(73) Assignee: Qingdao University of Technology, Shandong (CN)

( * ) Notice: Subject to any disclaimer, the term of this patent is extended or adjusted under 35 U.S.C. 154(b) by 7 days.

(21) Appl. No.: 16/608,633

(22) PCT Filed: Jun. 4, 2019

(86) PCT No.: PCT/CN2019/089935
§ 371 (c)(1),
(2) Date: Oct. 25, 2019

(87) PCT Pub. No.: WO2020/057174
PCT Pub. Date: Mar. 26, 2020

(65) Prior Publication Data
US 2021/0009855 A1    Jan. 14, 2021

(30) Foreign Application Priority Data
Sep. 21, 2018 (CN) .......................... 201811106866.5

(51) Int. Cl.
| | |
|---|---|
| *C09D 183/04* | (2006.01) |
| *C09D 5/10* | (2006.01) |
| *C08K 3/22* | (2006.01) |
| *C08K 9/06* | (2006.01) |
| *C09D 7/62* | (2018.01) |

(52) U.S. Cl.
CPC ............. *C09D 183/04* (2013.01); *C08K 3/22* (2013.01); *C08K 9/06* (2013.01); *C09D 5/103* (2013.01); *C09D 7/62* (2018.01)

(58) Field of Classification Search
CPC . C08K 3/22; C08K 9/06; C09D 5/103; C09D 7/62; C09D 183/04
See application file for complete search history.

(56) References Cited

U.S. PATENT DOCUMENTS

| | | | | |
|---|---|---|---|---|
| 4,731,264 | A * | 3/1988 | Lin ...................... | C09D 183/04 106/287.12 |
| 6,376,559 | B1 * | 4/2002 | Komoto ............. | C08G 18/6254 106/287.34 |

FOREIGN PATENT DOCUMENTS

| | | |
|---|---|---|
| CN | 87107834 A | 7/1988 |
| CN | 1152328 A | 6/1997 |
| CN | 102390936 A | 3/2012 |
| CN | 102964993 A | 3/2013 |
| CN | 106046914 A | 10/2016 |
| CN | 109251660 A | 1/2019 |
| EP | 0263428 A2 * | 4/1988 ........... C09D 183/04 |

OTHER PUBLICATIONS

International Search Report dated Aug. 22, 2019; International Application No. PCT/CN2019/089935; International Filing Date: Jun. 4, 2019; 5 pages.
English translation; China Published Application CN1152328; Publication Date: Jun. 18, 1997; 41 pages.
English translation; China Published Application CN87107834; Publication Date: Jul. 27, 1988; 25 pages.
English translation; China Published Application CN102390936; Publication Date: Mar. 28, 2012; 20 pages.
English translation; China Published Application CN102964993; Publication Date: Mar. 13, 2013; 15 pages.
English translation; China Published Application CN106046914; Publication Date: Oct. 26, 2016; 18 pages.
English translation; China Published Application CN109251660; Publication Date: Jan. 22, 2019; 14 pages.

* cited by examiner

*Primary Examiner* — Edward J Cain
(74) *Attorney, Agent, or Firm* — Blank Rome LLP

(57) ABSTRACT

The present invention relates to the field of building surface coating technologies, and in particular, to an alumina sol-silane composite material and a preparation method and application thereof. The alumina sol-silane composite material provided in the present invention is prepared by raw materials including the following components by weight parts: 5 to 45 parts of alumina sol, 30 to 90 parts of silane, 3 to 10 parts of silane coupling agent, and 1 to 5 parts of dispersant. A hydrophobic anticorrosive coating can be formed after coating the alumina sol-silane composite material provided in the present invention to a surface of a cement-based material, and has good waterproof performance and corrosion resistance.

19 Claims, No Drawings

ALUMINA SOL-SILANE COMPOSITE MATERIAL AND PREPARATION METHOD AND APPLICATION THEREOF

RELATED APPLICATIONS

This application is a U.S. national phase application of International Application No. PCT/CN2019/089935, filed Jun. 4, 2019; which application claims benefit of priority of Chinese Patent Application No. 201811106866.5, filed with the Chinese Patent Office Sep. 21, 2018 and entitled "ALUMINA SOL-SILANE COMPOSITE MATERIAL AND PREPARATION METHOD AND APPLICATION THEREOF". Each of the above-identified related applications are incorporated herein by reference in their entirety.

FIELD OF USE

The present invention relates to the field of building surface coating technologies, and in particular, to an alumina sol-silane composite material and a preparation method and application thereof.

BACKGROUND OF THE INVENTION

A building surface coating is one of important measures to improve durability of buildings. At present, commonly used building exterior surface coating coatings are generally divided into two types: a surface-coated type and a surface-penetrating type.

A surface-coated type coating is a cover coating formed on an outer surface of a building and is used for closing holes, cracks, and the like in the surface of the building so as to prevent water or corrosive substances from entering the interior of a building material, but it also blocks evaporation of water inside the building material, and often causes blistering, cracking, and other phenomena on the coating surface, affecting the appearance and durability of the building. A surface-penetrating coating can penetrate into the interior of a building material by 3 mm to 5 mm, forming a hydrophobic coating in this area without affecting the appearance of a building, thereby drawing widespread attention of engineers.

However, it is difficult for the surface-penetrating coating to prevent water from entering the interior of the building material through cracks in the surface of the building material, and corrosion resistance of the surface-penetrating coating is relatively poor.

SUMMARY OF THE INVENTION

An objective of the present invention is to provide an alumina sol-silane composite material and a preparation method and application thereof. The alumina sol-silane composite material provided in the present invention has good waterproof performance and corrosion resistance.

To achieve the above purpose, the present invention provides the following technical solutions.

The present invention provides an alumina sol-silane composite material, prepared by raw materials including the following components by weight parts: 5 to 45 parts of alumina sol, 30 to 90 parts of silane, 3 to 10 parts of silane coupling agent, and 1 to 5 parts of dispersant.

Preferably, a grain diameter of the alumina sol is 100 nm to 500 nm.

Preferably, a preparation method of the alumina sol includes successively conducting hydrolysis and polymerization on aluminum isopropoxide.

Preferably, a hydrolysis step includes dropwise adding an aluminum isopropoxide ethanol solution to distilled water for hydrolysis.

Preferably, a mass ratio of the distilled water to isopropanol is 1:2 to 1:5.

Preferably, hydrolysis temperature is 35° C. to 60° C.

Preferably, a polymerization step includes adding a hydrolysis product of the aluminum isopropoxide to a nitric acid solution for polymerization.

Preferably, polymerization temperature is 40° C. to 70° C.

Preferably, a concentration of the nitric acid solution is 0.5 mol/L to 3 mol/L.

Preferably, the silane is one or more of methyltrimethoxysilane, methyltriethoxysilane, trimethoxyvinylsilane, vinyltriethoxysilane, isobutyltrimethoxysilane, isobutyltriethoxysilane, trimethoxyoctylsilane, and triethoxyoctylsilane.

Preferably, the silane coupling agent is one or more of γ-(2,3-epoxypropoxy)propytrimethosysilane, γ-aminopropyltriethoxysilane, γ-methacryloxypropyltrimethoxysilane, N-β-(amino ethyl)-γ-amino propyl tri methoxy (ethyoxyl) silane, N-(β-aminoethyl)-γ-aminopropylmethylbimethoxy silane, and trimethoxyvinylsilane.

Preferably, the dispersant is one or more of sodium alkyl benzene sulfonate, polyvinyl alcohol, polyethylene glycol, and glycerol.

The present invention further provides a preparation method of the above alumina sol-silane composite material, including the following steps:

(1) mixing alumina sol and a silane coupling agent to obtain a first mixture;

(2) mixing silane, the silane coupling agent, and a dispersant to obtain a second mixture; and (3) mixing the first mixture and the second mixture to obtain an alumina sol-silane composite material, where the mixing in step (3) is conducted in a constant temperature condition, and mixing temperature is 60° C. to 80° C.; and there is no specific order between step (1) and step (2).

Preferably, a mixing manner in step (3) is dropwise adding the first mixture to the second mixture or dropwise adding the second mixture to the first mixture.

Preferably, a speed for dropwise adding the first mixture to the second mixture or dropwise adding the second mixture to the first mixture is independently 2 mL/min to 10 mL/min.

Preferably, a mass of the silane coupling agent in step (1) is 50% to 70% of a total mass of the silane coupling agent in step (1) and step (2).

Preferably, mixing temperature in step (1) is 35° C. to 75° C.

Preferably, mixing temperature in step (2) is 40° C. to 70° C.

The present invention further provides an application, in building coatings, of the above alumina sol-silane composite material or an alumina sol-silane composite material prepared by using the above preparation method.

Preferably, a manner of the application includes: coating the alumina sol-silane composite material to a surface of a building matrix for 2 times to 5 times, where a dosage is 200 g/m² to 300 g/m² during each time of coating; and after coating is completed, covering a plastic film on the building matrix surface for 3 days to 7 days, and removing the plastic film to obtain a coating with waterproof performance and corrosion resistance.

The present invention provides an alumina sol-silane composite material, prepared by raw materials including the following components by weight parts: 5 to 45 parts of alumina sol, 30 to 90 parts of silane, 3 to 10 parts of silane coupling agent, and 1 to 5 parts of dispersant. In the present invention, under an action of the silane coupling agent, the alumina sol and the silane are bonded to each other through chemical reaction, and after the dispersant is added, the alumina sol-silane composite material that is dispersed uniformly and has good waterproof performance and corrosion resistance is obtained. Results of embodiments show that, after the alumina sol-silane composite material provided in the present invention is coated to a surface of a cement-based material, a capillary water absorption coefficient of the cement-based material is only 28 $g \cdot m^{-2} \cdot h^{-1}$ to 55 $g \cdot m^{-2} \cdot h^{-1}$, while a capillary water absorption coefficient of an uncoated cement-based material reaches up to 118.6 $g \cdot m^{-2} \cdot h^{-1}$; a static contact angle between the cement-based material in the present invention and water may reach higher than 120°, while a static contact angle between the uncoated cement-based material and water is only 50°; a diffusion coefficient of chloride ions of the cement-based material in the present invention is $0.8 \times 10^{-12}$ $m^2 \cdot s^{-1}$ to $5.4 \times 10^{-12}$ $m^2 \cdot s^{-1}$, while a diffusion coefficient of chloride ions of the uncoated cement-based material is $7.5 \times 10^{-11}$ $m^2 \cdot s^{-1}$. This indicates that a coating formed by the alumina sol-silane composite material provided in the present invention on the surface of the cement-based material has characteristics of hydrophobic performance and corrosion resistance.

DETAILED DESCRIPTION

The present invention provides an alumina sol-silane composite material, prepared by raw materials including the following components by weight parts: 5 to 45 parts of alumina sol, 30 to 90 parts of silane, 3 to 10 parts of silane coupling agent, and 1 to 5 parts of dispersant.

Raw materials for preparation of the alumina sol-silane composite material provided in the present invention include by weight parts: 5 to 45 parts of alumina sol, preferably 5 to 25 parts of alumina sol and further preferably 15 to 25 parts of alumina sol. In the present invention, a grain diameter of the alumina sol is preferably 100 nm to 500 nm and is further preferably 200 nm to 400 nm. In a conventional cognition in the art, the grain diameter of the alumina sol is a grain diameter of alumina in the alumina sol, and this is also applicable to the present invention. In the present invention, the grain diameter of the alumina sol is controlled to be within the foregoing range, and this is beneficial to improvement of waterproof performance and corrosion resistance of the final alumina sol-silane composite material.

In the present invention, the alumina sol is preferably obtained by successively conducting hydrolysis and polymerization on aluminum isopropoxide.

In the present invention, the aluminum isopropoxide is preferably provided in a form of an aluminum isopropoxide ethanol solution; a preparation manner of the aluminum isopropoxide ethanol solution is preferably obtained by uniformly mixing aluminum isopropoxide and ethanol through ultrasonic dispersion, to obtain the aluminum isopropoxide ethanol solution; and a mass ratio of the aluminum isopropoxide to the ethanol is 1:3 to 1:10 and is further preferably 1:3 to 1:7.

In the present invention, the aluminum isopropoxide ethanol solution is preferably dropwise added to distilled water for hydrolysis in a stirring condition, to obtain a hydrolysis product. In the present invention, the hydrolysis is preferably conducted in a constant temperature condition, and hydrolysis temperature is preferably 35° C. to 60° C. and is further preferably 45° C. In the present invention, a stirring rate is preferably 1500 r/min to 3500 r/min and is further preferably 2000 r/min. a dropwise adding speed is preferably 2 mL/min to 10 mL/min. After dropwise adding is completed, in the present invention, mixed material liquid preferably continues to be stirred for 1 h to 2 h, and then is stood for 24 h in a constant temperature condition of 45° C. to 75° C., to obtain the hydrolysis product. In the present invention, a mass ratio of the distilled water to the aluminum isopropoxide is preferably 1:2 to 1:5.

After the hydrolysis product is obtained, in the present invention, polymerization is conducted on the hydrolysis product to obtain the alumina sol. In the present invention, the hydrolysis product is further preferably added to a nitric acid solution for polymerization, to obtain the alumina sol. In the present invention, the polymerization is preferably conducted in a constant temperature condition; polymerization temperature is preferably 40° C. to 70° C. and is further preferably 50° C.; a concentration of the nitric acid solution is preferably 0.5 mol/L to 3 mol/L and is further preferably 1 mol/L to 1.5 mol/L; a dosage of the nitric acid solution is preferably 5% to 30% of a mass of the hydrolysis product and is further preferably 10% to 15% of the mass of the hydrolysis product; and in the present invention, after nitric acid solution adding is completed, stirring preferably continues to be conducted for 1 hour to 10 hours.

In the present invention, conditions of hydrolysis and a polymerization reaction are controlled to obtain the alumina sol with a grain diameter of 100 nm to 500 nm. In the present invention, there is no special requirement on sources of the aluminum isopropoxide, the ethanol, the distilled water, and the nitric acid solution, provided that aluminum isopropoxide, ethanol, distilled water, and a nitric acid solution whose sources are well known by persons skilled in the art are used.

A weight part of the alumina sol is used as a reference, and raw materials for preparation of the alumina sol-silane composite material provided in the present invention include 30 to 90 parts of silane, preferably 30 to 70 parts of silane and further preferably 50 to 70 parts of silane. In the present invention, the silane is preferably one or more of methyltrimethoxysilane, methyltriethoxysilane, trimethoxyvinylsilane, vinyltriethoxysilane, isobutyltrimethoxysilane, isobutyltriethoxysilane, trimethoxyoctylsilane, and triethoxyoctylsilane. In the present invention, there is no special requirement on a source of the silane, provided that silane whose source is well known by persons skilled in the art is used. Specifically, the silane is a commercially available product or the like.

A weight part of the alumina sol is used as a reference, and raw materials for preparation of the alumina sol-silane composite material provided in the present invention include 3 to 10 parts of silane coupling agent, preferably 3 to 8 parts of silane coupling agent. In the present invention, the silane coupling agent is preferably one or more of γ-(2,3-epoxypropoxy)propyltrimethosysilane, γ-aminopropyltriethoxysilane, γ-methacryloxypropyltrimethoxysilane, N-β-(amino ethyl)-γ-amino propyl tri methoxy (ethyoxyl) silane, N-(β-aminoethyl)-γ-aminopropylmethylbimethoxy silane, and trimethoxyvinylsilane. In the present invention, there is no special requirement on a source of the silane coupling agent, provided that a commercially available silane coupling agent well known by persons skilled in the art is used.

A weight part of the alumina sol is used as a reference, and raw materials for preparation of the alumina sol-silane composite material provided in the present invention include 1 to 5 parts of dispersant, preferably 2 to 4 parts of dispersant. In the present invention, the dispersant is preferably one or more of sodium alkyl benzene sulfonate, polyvinyl alcohol, polyethylene glycol, and glycerol. In the present invention, there is no special requirement on a source of the dispersant, provided that a dispersant whose source is well known by persons skilled in the art is used.

The present invention further provides a preparation method of the alumina sol-silane composite material in the foregoing technical solution, including the following steps:

(1) Mix alumina sol and a silane coupling agent to obtain a first mixture.

(2) Mix silane, the silane coupling agent, and a dispersant to obtain a second mixture.

(3) Mix the first mixture and the second mixture to obtain an alumina sol-silane composite material.

The mixing in step (3) is conducted in a constant temperature condition, and mixing temperature is 60° C. to 80° C.; and there is no specific order between step (1) and step (2).

In the present invention, the alumina sol and the silane coupling agent are mixed to obtain the first mixture. In the present invention, the mixing is preferably conducted in a constant temperature condition, and the mixing temperature is preferably 35° C. to 75° C., and is further preferably 40° C. In the present invention, the mixing is preferably stirring and mixing, and there is no special requirement on a rate and time for stirring and mixing, provided that a uniform mixing effect can be achieved.

In the present invention, the silane, the silane coupling agent, and the dispersant are mixed to obtain the second mixture. In the present invention, the mixing is preferably conducted in a constant temperature condition, and the mixing temperature is preferably 40° C. to 70° C., and is further preferably 50° C. In the present invention, the mixing is preferably stirring and mixing, and there is no special requirement on a rate and time for stirring and mixing, provided that a uniform mixing effect can be achieved. In the present invention, in a preparation process of the first mixture, a mass of the silane coupling agent is preferably 20% to 70% of a total mass of the silane coupling agent in preparation processes of the first mixture and the second mixture and is further preferably 50% to 70% of the total mass.

In the present invention, there is no specific order between preparation of the first mixture and the second mixture. In the present invention, whether the first mixture is first prepared or the second mixture is first prepared has no impact on preparation of the alumina sol-silane composite material.

In the present invention, after the first mixture and the second mixture are obtained, the first mixture and the second mixture are mixed to obtain the alumina sol-silane composite material. In the present invention, the mixing is preferably conducted in a constant temperature condition, and the mixing temperature is preferably 60° C. to 80° C., and is further preferably 70° C. In the present invention, before the first mixture and the second mixture are mixed, the second mixture is preferably stood for 24 hours in the present invention, standing is preferably conducted in a constant temperature condition, and standing temperature is preferably 40° C. to 70° C., and is further preferably 50° C. In the present invention, standing can make the second mixture more uniform. In the present invention, the mixing is preferably conducted in a stirring condition, and a mixing rate is preferably 2000 r/min to 5000 r/min and is further preferably 3000 r/min to 4000 r/min. In the present invention, a mixing manner is preferably a dropwise adding manner, and the first mixture is dropwise added to the second mixture or the second mixture is dropwise added to the first mixture. In the present invention, a dropwise adding speed is preferably 2 mL/min to 10 mL/min, and the dropwise adding is beneficial to uniform reaction of the silane and the alumina sol, avoiding product unevenness caused by local rapid reaction.

In the present invention, the first mixture and the second mixture are mixed, and under an action of the silane coupling agent, the alumina sol and the silane are bonded to each other through chemical reaction, and after the dispersant is added, the alumina sol-silane composite material that is dispersed uniformly and has good waterproof performance and corrosion resistance is obtained.

The present invention further provides an application, in building coatings, of the alumina sol-silane composite material in the foregoing technical solution or the alumina sol-silane composite material prepared by using the preparation method in the foregoing technical solution.

In the present invention, there is no special requirement on an implementation manner of the application, provided that an implementation manner well known by persons skilled in the art is used. In the present invention, the application is specifically: coating the alumina sol-silane composite material to a surface of a building matrix for 2 times to 5 times, where a dosage is 200 g/m$^2$ to 300 g/m$^2$ during each time of coating; and after coating is completed, covering a plastic film on the building matrix surface for 3 days to 7 days, and removing the plastic film to obtain a coating with waterproof performance and corrosion resistance. In the present invention, there is no special requirement on a coating manner, provided that a coating manner well known by persons skilled in the art is used. Specifically, the coating manner is spraying, roller coating, or brush coating.

With reference to embodiments, the following describes in detail an alumina sol-silane composite material and a preparation method and application thereof, but they cannot be understood as a limitation of the protection scope of the present invention.

Preparation of Alumina Sol:

(1) Uniformly mix (by weight part) aluminum isopropoxide 1 and ethanol 5 through ultrasonic dispersion, to obtain an aluminum isopropoxide ethanol solution.

(2) Add distilled water 3 into a three-necked flask, place the three-necked flask in a thermostat water bath, conduct stirring at a uniform speed of 2000 r/min, dropwise add the aluminum isopropoxide ethanol solution, and conduct stirring at a uniform speed of 2500 r/min for 1 hour at constant temperature of 45° C.; and take out a bottle plug, and conduct stirring in an open condition for 1 hour at constant temperature of 60° C., to obtain a hydrolysis product.

(3) Add a nitric acid solution 1 to the hydrolysis product, and conduct stirring for 2 hours at constant temperature of 50° C. to obtain alumina sol.

In all of the following embodiments, the alumina sol prepared by using the foregoing method is used as a raw material.

Embodiment 1

Counted as weight parts, the alumina sol 15 and γ-(2,3-epoxypropoxy)propytrimethosysilane 1 are stirred and mixed at 50° C. to obtain a first mixture.

Isobutyltriethoxysilane 75, the γ-(2,3-epoxypropoxy)propytrimethosysilane 4, and polyethylene glycol 2000 5 are stirred and mixed at 60° C. to obtain a second mixture, the second mixture is stood at 60° C. for 24 h, and the second mixture is dropwise added to the first mixture at constant temperature of 60° C. at a rotating speed of 3000 r/min to obtain alumina sol-silane composite emulsion.

The alumina sol-silane composite emulsion is sprayed onto a matrix surface of concrete two times, where a total coating area is 600 g/m$^2$; and after coating is completed, a plastic film is covered on the matrix surface for 7 days, and the plastic film is removed. Through test, a surface contact angle of the concrete reaches 128°, a capillary water absorption coefficient is 50.3 g·m$^{-2}$·h$^{-1}$, and a diffusion coefficient of chloride ions is 5.0×10$^{-12}$ m$^2$·s$^{-1}$.

Embodiment 2

Counted as weight parts, the alumina sol 20 and γ-aminopropyltriethoxysilane 3 are stirred and mixed at 40° C. to obtain a first mixture.

Triethoxyoctylsilane 70, the γ-aminopropyltriethoxysilane 3, and polyethylene glycol 1750 4 are stirred and mixed at 50° C. to obtain a second mixture, the second mixture is stood at 50° C. for 24 h, and the second mixture is dropwise added to the first mixture at constant temperature of 70° C. at a rotating speed of 3000 r/min to obtain alumina sol-silane composite emulsion.

The alumina sol-silane composite emulsion is sprayed onto a matrix surface of concrete three times, where a total coating area is 400 g/m$^2$; and after coating is completed, a plastic film is covered on the matrix surface for 4 days, and the plastic film is removed. Through test, a surface contact angle of the concrete reaches 137°, a capillary water absorption coefficient is 31.3 g·m$^{-2}$·h$^{-1}$, and a diffusion coefficient of chloride ions is 2.0×10$^{-12}$ m$^2$·s$^{-1}$.

Embodiment 3

Counted as weight parts, the alumina sol 40 and N-(β-aminoethyl)-γ-aminopropylmethylbimethoxy silane 5 are stirred and mixed at 40° C. to obtain a first mixture.

Trimethoxyvinylsilane 50, the N-(β-aminoethyl)-γ-aminopropylmethylbimethoxy silane 3, and glycerol 2 are stirred and mixed at 40° C. to obtain a second mixture, the second mixture is stood at 40° C. for 24 h, and the second mixture is dropwise added to the first mixture at constant temperature of 60° C. at a rotating speed of 3000 r/min to obtain alumina sol-silane composite emulsion.

The alumina sol-silane composite emulsion is coated onto a matrix surface of concrete four times through brush coating, where a total coating area is 800 g/m$^2$; and after coating is completed, a plastic film is covered on the matrix surface for 5 days, and the plastic film is removed. Through test, a surface contact angle of the concrete reaches 127°, a capillary water absorption coefficient is 49.3 g m$^{-2}$·h$^{-1}$, and a diffusion coefficient of chloride ions is 1.0×10$^{-12}$ m$^2$·s$^{-1}$.

Comparative Example

Performance test is conducted on an uncoated cement-based material. Through test, a capillary water absorption coefficient of the uncoated cement-based material reaches up to 118.6 g·m$^{-2}$·h$^{-1}$; a static contact angle between the uncoated cement-based material and water is only 50°; and a diffusion coefficient of chloride ions of the uncoated cement-based material is 7.5×10$^{-11}$ m$^2$·s$^{-1}$.

It can be learned from the foregoing embodiments and the Comparative Example that, after the alumina sol-silane composite material provided in the present invention is coated to a surface of a cement-based material, a capillary water absorption coefficient of the cement-based material is only 28 g·m$^{-2}$·h$^{-1}$ to 55 g·m$^{-2}$·h$^{-1}$, while a capillary water absorption coefficient of an uncoated cement-based material reaches up to 118.6 g·m$^2$·h$^{-1}$; a static contact angle between the cement-based material in the present invention and water may reach higher than 120°, while a static contact angle between the uncoated cement-based material and water is only 50°; a diffusion coefficient of chloride ions of the cement-based material in the present invention is 0.8×10$^{-12}$ m$^2$·s$^{-1}$ to 5.4×10$^{-12}$ m$^2$·s$^{-1}$, while a diffusion coefficient of chloride ions of the uncoated cement-based material is 7.5×10$^{-11}$ m$^2$·s$^{-1}$. This indicates that the alumina sol-silane composite material provided in the present invention has characteristics of hydrophobic performance and corrosion resistance after forming a coating on the surface of the cement-based material.

The above description of the embodiment is only for helping to understand the method of the present invention and its core idea. It should be noted that, several improvements and modifications may be made by persons of ordinary skill in the art without departing from the principle of the present invention, and these improvements and modifications should also be considered within the protection scope of the present invention. Various modifications to these embodiments are readily apparent to persons skilled in the art, and the generic principles defined herein may be practiced in other embodiments without departing from the spirit or scope of the invention. Thus, the present invention is not limited to the embodiments shown herein but falls within the widest scope consistent with the principles and novel features disclosed herein.

What is claimed is:

1. An alumina sol-silane composite material, prepared by raw materials comprising the following components by weight parts: 5 to 45 parts of alumina sol, 30 to 90 parts of silane, 3 to 10 parts of silane coupling agent, and 1 to 5 parts of dispersant;

the silane is one or more of methyltrimethoxysilane, methyltriethoxysilane, trimethoxyvinylsilane, vinyltriethoxysilane, isobutyltrimethoxysilane, isobutyltriethoxysilane, trimethoxyoctylsilane, and triethoxyoctylsilane;

the silane coupling agent is one or more of γ-(2,3-epoxypropoxy)propytrimethosysilane, γ-aminopropyltriethoxysilane, γ-methacryloxypropyltrimethoxysilane, N-β-(amino ethyl)-γ-amino propyl tri methoxy (ethyoxyl) silane, N-(β-aminoethyl)-γ-aminopropylmethylbimethoxy silane, and trimethoxyvinylsilane.

2. The alumina sol-silane composite material according to claim 1, wherein a grain diameter of the alumina sol is 100 nm to 500 nm.

3. The alumina sol-silane composite material according to claim 1, wherein the alumina sol is obtained by successively conducting hydrolysis and polymerization on aluminum isopropoxide.

4. The alumina sol-silane composite material according to claim 1, wherein the dispersant is one or more of sodium alkyl benzene sulfonate, polyvinyl alcohol, polyethylene glycol, and glycerol.

5. A preparation method of the alumina sol-silane composite material according to claim 1, comprising the following steps:

(1) mixing alumina sol and a silane coupling agent to obtain a first mixture;
(2) mixing silane, the silane coupling agent, and a dispersant to obtain a second mixture; and
(3) mixing the first mixture and the second mixture to obtain an alumina sol-silane composite material, wherein
the mixing in step (3) is conducted in a constant temperature condition, and mixing temperature is 60° C. to 80° C.; and
there is no specific order between step (1) and step (2).

6. The preparation method according to claim 5, wherein a mixing manner in step (3) is dropwise adding the first mixture to the second mixture or dropwise adding the second mixture to the first mixture.

7. The preparation method according to claim 5, wherein a mass of the silane coupling agent in step (1) is 50% to 70% of a total mass of the silane coupling agent in step (1) and step (2).

8. An application, in building coatings, of the alumina sol-silane composite material according to claim 1.

9. The alumina sol-silane composite material according to claim 2, wherein the alumina sol is obtained by successively conducting hydrolysis and polymerization on aluminum isopropoxide.

10. A preparation method of the alumina sol-silane composite material according to claim 2, comprising the following steps:
(1) mixing alumina sol and a silane coupling agent to obtain a first mixture;
(2) mixing silane, the silane coupling agent, and a dispersant to obtain a second mixture; and
(3) mixing the first mixture and the second mixture to obtain an alumina sol-silane composite material, wherein
the mixing in step (3) is conducted in a constant temperature condition, and mixing temperature is 60° C. to 80° C.; and
there is no specific order between step (1) and step (2).

11. A preparation method of the alumina sol-silane composite material according to claim 3, comprising the following steps:
(1) mixing alumina sol and a silane coupling agent to obtain a first mixture;
(2) mixing silane, the silane coupling agent, and a dispersant to obtain a second mixture; and
(3) mixing the first mixture and the second mixture to obtain an alumina sol-silane composite material, wherein
the mixing in step (3) is conducted in a constant temperature condition, and mixing temperature is 60° C. to 80° C.; and
there is no specific order between step (1) and step (2).

12. A preparation method of the alumina sol-silane composite material according to claim 9, comprising the following steps:
(1) mixing alumina sol and a silane coupling agent to obtain a first mixture;
(2) mixing silane, the silane coupling agent, and a dispersant to obtain a second mixture; and
(3) mixing the first mixture and the second mixture to obtain an alumina sol-silane composite material, wherein
the mixing in step (3) is conducted in a constant temperature condition, and mixing temperature is 60° C. to 80° C.; and
there is no specific order between step (1) and step (2).

13. A preparation method of the alumina sol-silane composite material according to claim 4, comprising the following steps:
(1) mixing alumina sol and a silane coupling agent to obtain a first mixture;
(2) mixing silane, the silane coupling agent, and a dispersant to obtain a second mixture; and
(3) mixing the first mixture and the second mixture to obtain an alumina sol-silane composite material, wherein
the mixing in step (3) is conducted in a constant temperature condition, and mixing temperature is 60° C. to 80° C.; and
there is no specific order between step (1) and step (2).

14. The preparation method according to claim 10, wherein a mixing manner in step (3) is dropwise adding the first mixture to the second mixture or dropwise adding the second mixture to the first mixture.

15. The preparation method according to claim 11, wherein a mixing manner in step (3) is dropwise adding the first mixture to the second mixture or dropwise adding the second mixture to the first mixture.

16. The preparation method according to claim 12, wherein a mixing manner in step (3) is dropwise adding the first mixture to the second mixture or dropwise adding the second mixture to the first mixture.

17. The preparation method according to claim 13, wherein a mixing manner in step (3) is dropwise adding the first mixture to the second mixture or dropwise adding the second mixture to the first mixture.

18. The preparation method according to claim 10, wherein a mass of the silane coupling agent in step (1) is 50% to 70% of a total mass of the silane coupling agent in step (1) and step (2).

19. The preparation method according to claim 11, wherein a mass of the silane coupling agent in step (1) is 50% to 70% of a total mass of the silane coupling agent in step (1) and step (2).

* * * * *